United States Patent [19]

Toth et al.

[11] Patent Number: 5,018,633
[45] Date of Patent: May 28, 1991

[54] CONTAINER HOLDER

[75] Inventors: Eric S. Toth; Gary T. DeBoer; Linh H. Pham, all of Holland, Mich.

[73] Assignee: Prince Corporation, Holland, Mich.

[21] Appl. No.: 478,452

[22] Filed: Feb. 12, 1990

[51] Int. Cl.⁵ .................................................. B60N 3/10
[52] U.S. Cl. ........................ 248/311.2; 224/42.42; 248/314
[58] Field of Search .............. 248/311.2, 207, 213.2, 248/318, 314, 315; 297/194, 188; 211/1.3; 224/281, 282, 275, 42.43, 42.44, 42.42; 296/37.15, 37.16

[56] References Cited

U.S. PATENT DOCUMENTS

| | | | |
|---|---|---|---|
| 3,637,184 | 1/1972 | O'Brien | 297/194 X |
| 4,040,659 | 8/1977 | Arnold | 297/194 |
| 4,417,764 | 11/1983 | Marcus et al. | 297/194 |
| 4,453,759 | 6/1984 | Kathiria | 296/37.8 |
| 4,583,707 | 4/1986 | Anderson | 248/293 |
| 4,685,729 | 8/1987 | Heesch et al. | 297/193 |
| 4,738,423 | 4/1988 | DiFilippo et al. | 248/311.2 |
| 4,759,584 | 7/1988 | Dykstra et al. | 297/194 |
| 4,818,017 | 4/1989 | Dykstra et al. | 297/194 |

Primary Examiner—Carl D. Friedman
Assistant Examiner—Derek J. Berger
Attorney, Agent, or Firm—Price Heneveld Cooper DeWitt & Litton

[57] ABSTRACT

A combined storage compartment and container holder for a motor vehicle. The storage compartment and container holder is of a substantially rectangular box-like configuration which is divided into two sections. A storage compartment depends from an edge member about the first section and a pair of container holders are mounted in the second section. The combined unit can be concealed within an armrest until needed at which time it can be extended out of the armrest to expose the container holder and on further extension a storage compartment. The container holders are stored in a vertical facing position and are guided to a horizontal use position by pairs of spaced pins on opposite outer edges of each cup-like holder which traverse guide slots formed in a pair of spaced vertical walls.

16 Claims, 2 Drawing Sheets

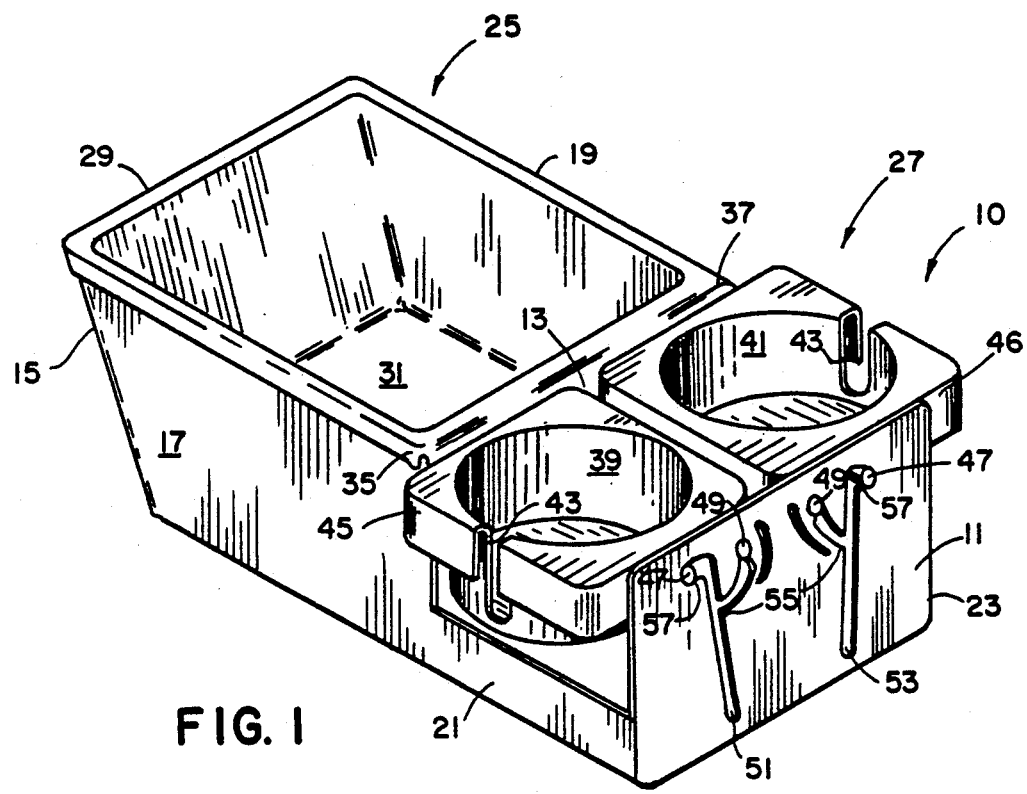
FIG. 1
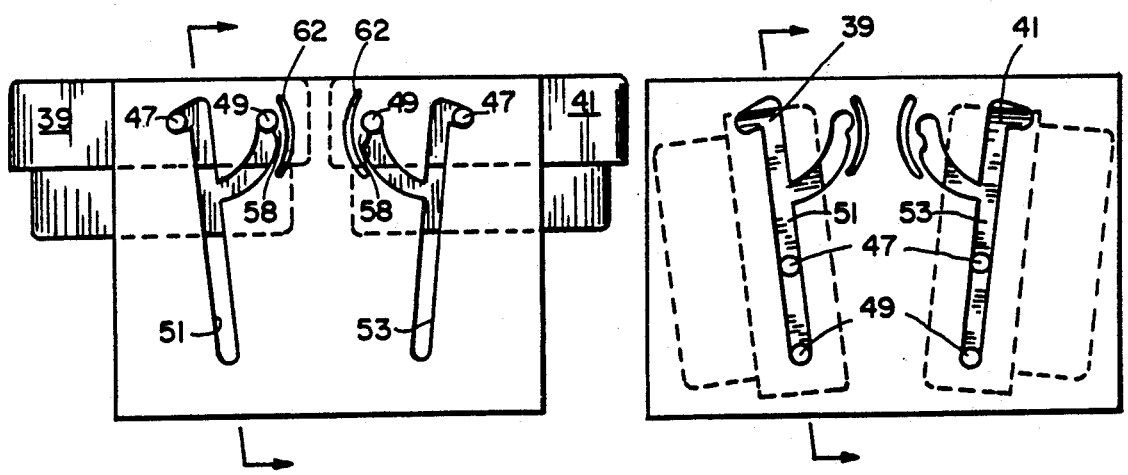
FIG. 2
FIG. 3

CONTAINER HOLDER

BACKGROUND OF THE INVENTION

The present invention relates to a combined holder for liquid containers and a storage compartment which is intended to be concealed within a hollow center console for the front seat of a motor vehicle. Many efforts have been made in the past to provide motor vehicles with a holder for a liquid container such as a can, cup or glass and a storage compartment. For example, the cover of the glove box was modified to provide one or more recesses which would confine the bottom of a glass or can to prevent it from sliding off the cover when it was used as a shelf. This type of configuration was commonly used with bench-type or full width seating.

As motor vehicles changed and individual front seats became the preferred configuration, a center console was provided between the seats which had a lid which could be opened to provide a storage compartment. In order to provide a holder for a container, a cup holder was provided in the storage compartment which could be raised vertically and then pivoted over the front edge of the storage compartment. This unit could be withdrawn from its stored position for use in carrying liquid containers. The center console was also modified to provide liquid container holders which could be drawn forwardly out of the center console and then expended by flipping opposite sides of a circular holder into position so that a holder could hold two cups or containers. While many suitable units were prepared and incorporated in motor vehicles, no convenient unit was found which could be concealed within a hollow center console and could be extended to provide both a holder for a liquid container, and on further extension, a storage compartment.

SUMMARY OF THE INVENTION

In accordance with the present invention, a combined storage compartment and container holder is provided for the center console of a motor vehicle which can be moved from a stored position within the console to a use position extending from the console forward towards the dashboard. The combined unit is made of a substantially rectangular box-like housing having a bottom and vertically upstanding side, front and rear walls. A vertically upstanding partition wall is positioned between the front and rear walls and divides the housing into a first and a second section with the sidewall of the first section extending to the top of the housing and with the sidewall of the second section extending only part way toward the top. A pattern of vertically inclined guide slots is provided in the front wall and in the partition wall. At least one container holder, and preferably two, are positioned in the second section and are supported by pairs of spaced guide pins on opposite outer surfaces of the container holder. The guide pins are positioned in the guide slots in the vertically upstanding walls. The spaced pins and guide slots cooperate to control the sliding and pivotal movement of the container holder from a vertically inclined stored position within the housing up to a horizontally inclined use position near the top of the housing. The first section of the housing has a cover with a storage compartment depending therein.

BRIEF DESCRIPTION OF THE DRAWINGS

FIG. 1 is a perspective view of the combined storage compartment and container holder with the container holders shown in their use position;

FIG. 2 is an end elevational view of the combined storage compartment and container holder showing the container holders in their horizontal use position;

FIG. 3 is an end elevational view showing the container holders in the stored position;

DETAILED DESCRIPTION OF THE PREFERRED EMBODIMENTS

Figure 4:
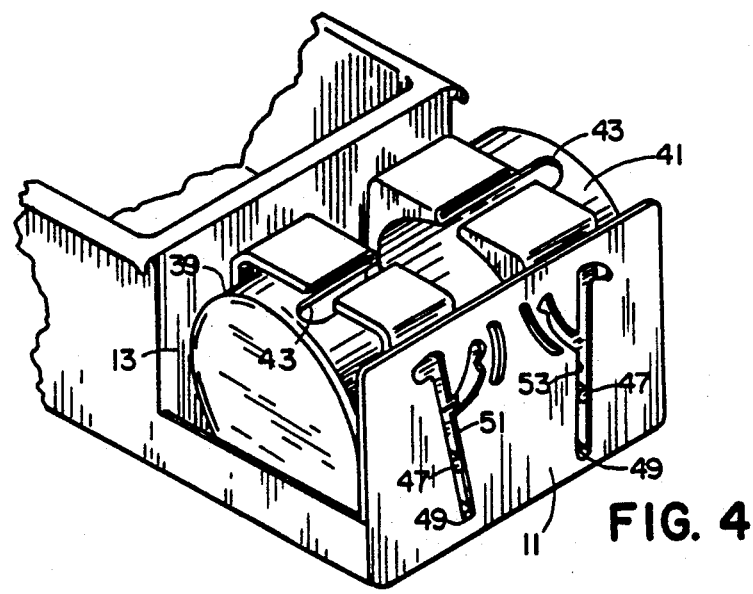
FIG. 4 is a partial perspective view of the combined storage compartment of FIG. 1 showing the container holders in their stored position.

Referring to FIG. 1, the combined storage compartment and container holder for a motor vehicle is shown and indicated generally by the number 10. The unit is of a substantially rectangular box-like configuration having a front wall 11, a partition wall 13, an end wall 15, first sidewalls 17 and 19, and second sidewalls 21 and 23. The partition wall 13 divides the unit into two sections, a first section 25 and a second section 27. The first section 25 has an upper member 19 covering a portion of the top thereof with a storage compartment 31 depending therefrom.

On either side of the top 29 are fastened inverted U-shaped tracks 35 and 37 which are used to support the unit within the hollow center console of the motor vehicle. A pair of tracks would be provided in the center console to mate with the tracks 35 and 37 to guide the movement of the unit 10 as it moves into and out of the center console. A piece of decorative plastic or padding material can be placed over the outer surface of the wall 11 to match the decor of the motor vehicle. A pair of horizontally positioned container holders 39 and 41 are shown mounted in the second section 27. Each of the container holders has a slot 43 which is used to facilitate the placement of a liquid container with a handle such as a cup.

Figure 5:
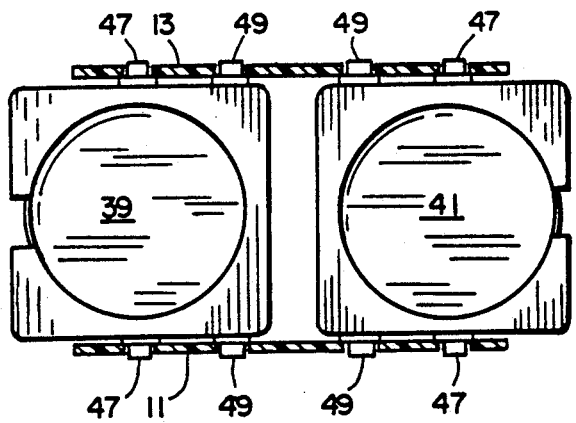
FIG. 5 is a partial top plan view showing the container holders supported in the use position by the end wall and the partition wall.

The container holders 39 and 41 each have a substantially rectangular turned down collars 45 and 46. A pair of spaced pins 47 and 49 mounted on opposite sides of each container holder and are used to support the container holders 39 and 41 and to guide their movement in vertically inclined slots 51 and 53. The center partition 13 has a similar pair of vertically inclined slots (FIG. 5) for guiding a similar pair of pins on the opposite sides of the container holders 39 and 41.

Figure 6:
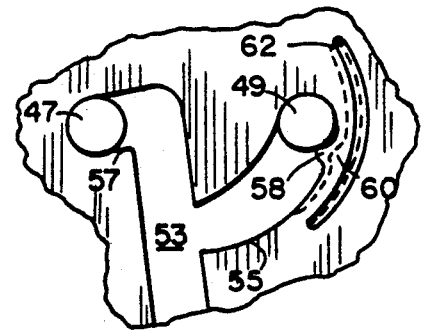
FIG. 6 is a partial elevational view showing the pins which support a container holder in the use position and showing how the wall has an arcuate aperture therein to provide flexibility for the support pin as it cams the supporting detent out of the way as it is raised and lowered.

The vertically inclined guide slots 51 and 53 in the end wall 11 and the partition wall 13 each have a branch slot 55 which is used to guide the motion of the pins 49 as the container holders 39 and 41 pivot about pin 47 which is supported in a second branch slot 57. The pin 49 is supported by a detent member 58 (FIG. 6). The detent member 58 can be cammed out of the way by the pin 49 causing the partition wall 60 to flex into the substantially arcuate shaped aperture 62. The vertically inclined guide slots 51 and 53 can be parallel to each other. However, it is preferred that the bottom portion of the slots be closer together than the top portions so that the container holders 39 and 41 will be guided toward the center of second section 27 of the combined unit.

The stored position of the container holders 39 and 41 is shown in FIG. 3 with guide pins 47 and 49 inclined vertically in the guide paths 51 and 53. As discussed above, the vertical guide slots are inclined to steer the container holder toward the center of the unit to help in making a compact assembly for storage in the center console.

When the container holders 39 and 41 are in their horizontally inclined use position, the container holders are supported by pins 47 and 49. An accidental horizontal bump will not allow the container holders to retract as the pins 47 and 49 are in alignment in the horizontal direction. As can be seen in FIGS. 2 and 3, the pins 49 have to be moved completely out of the branch slots 55 before the container holders will rotate to the vertically inclined storage position. This safety feature helps to prevent spills of any liquid container supported in the container holders.

The combined storage compartment and container holder of the present invention can be made by conventional plastic fabrication techniques such as injection molding or casting. The individual components can also be fabricated and then assembled by gluing or welding. Many different organic polymeric materials can be used to make the combined storage compartment and container holder. For example, an ABS plastic material can be used or a polycarbonate material. Both materials and equivalent polymeric materials can be colored with suitable pigments to match the interior color scheme of the motor vehicle.

It can be seen that the combined utility compartment of the present invention provides a convenient holder for liquid containers as well as a storage compartment for larger objects such as musical tapes, gloves and the like. The utility compartment can be extended partly from the center console to expose the container holders or can be fully extended to expose the storage compartment and coin holder.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A combined storage compartment and container holder comprising:
   a substantially rectangular box-like housing, said housing having a first vertically upstanding end wall and a second vertically upstanding wall spaced from said first vertically upstanding wall and dividing said housing into a first section and a second section, each of said vertically upstanding walls having at least one vertically inclined guide slot formed therein, said first section of said housing defining a storage compartment;
   at least one container holder slidably mounted in the second section of said housing;
   a pair of spaced guide pins positioned on opposite outer sides of said container holder, said guide pins being fitted in the guide slots in each vertically upstanding wall and serving to control the movement of said at least one container holder form a vertical storage position to a horizontal use position in the second section of said housing; wherein two vertically inclined guide slots are provided in each vertically upstanding wall to control the movement of two container holders.

2. A combined storage compartment and container holder as set forth in claim 1, wherein two separately useable container holders are slidably disposed in the second section of said housing.

3. A combined storage compartment and container holder as set forth in claim 1, wherein each of said container holders has a turned-down collar portion of a substantially square configuration.

4. A combined storage compartment and container holder as set forth in claim 3, wherein each of said container holders has a slot extending through said collar to facilitate the seating of a container with a handle.

5. A combined storage compartment and container holder as set forth in claim 4, wherein the lower position of said vertically inclined guide slots ar closer together than the upper portions to guide said container holders into a compact storage position.

6. A combined storage compartment and container holder as set forth in claim 1, wherein each of said guide slots in said vertically upstanding walls has a vertically inclined branch slot and a horizontally inclined branch slot intersecting said vertically inclined branch slot to enable said container holder to move from a vertical to a horizontal position, wherein said horizontally inclined branch slot provides a support for at least one of said guide pins on said container holder.

7. A combined storage compartment and container holder as set forth in claim 6, wherein said vertically inclined branch slot has a detent member for supporting a pin on said container holder.

8. A combined storage compartment and container holder as set forth in claim 6, wherein an arcuate aperture is provided adjacent said vertically inclined branch slot and said detent member is disposed on the flexible wall separating said vertically inclined branch slot and said arcuate aperture.

9. A combined storage compartment and container holder comprising:
   a substantially rectangular box-like housing, said housing having a first vertically upstanding end wall and a second vertically upstanding wall spaced from said first vertically upstanding wall and dividing said housing into a first section and a second section, each of said vertically upstanding walls having at least one vertically inclined guide slot formed therein, said first section of said housing defining a storage compartment;
   a pair of container holders slidably mounted in the second section of said housing;
   a pair of spaced guide pins positioned on opposite outer sides of each of said container holders, said guide pins being fitted in the guide slots in each vertically upstanding wall and serving to control the movement of said at least one container holder form a vertical storage position to a horizontal use position in the second section of said housing; wherein said container holders face each other when in the stored position and extend away from each other in a horizontal plane when in the use position.

10. A dual container holder for a motor vehicle which can be moved from a stored position within a housing to a use position extending from the housing comprising:

a substantially rectangular box-like housing having at least vertically upstanding front and rear walls; wherein each of said walls includes a pair of spaced generally vertically extending guide slots formed therein, and wherein each of said guide slots include an intersecting generally inclined branch slot; and a pair of container holders positioned between said walls, each of said container holders including a pair of spaced guide pins which are disposed on opposite outer surfaces thereof and positioned in said guide slots and branch slots in said vertically upstanding walls, said spaced pins and said guide and branch slots cooperating to control the sliding and pivoting movement of said container holders from a generally vertical stored position in said housing to a horizontal use position extended from said housing.

11. The container holder as defined in claim 10 wherein each of said container holders has a turned-down collar portion of a substantially square configuration.

12. The container holder as defined in claim 11 wherein each of said container holders has a slot extending through said collar to facilitate the seating of a container with a handle.

13. The container holder as defined in claim 12 wherein said container holders face each other when in the stored position and extend away from each other in a horizontal plane when in the use position.

14. The container holder as defined in claim 13 wherein the lower position of said vertically extending guide slots are closer together than the upper portions to guide said container holders into a compact storage position.

15. The container holder as defined in claim 14 wherein said inclined branch slots include a detent member for releasably supporting a guide pin on said container holders for releasably locking said container holders in a use position.

16. The container holder as defined in claim 15 wherein an arcuate aperture is provided adjacent said inclined branch slot and said detent member is disposed on the flexible wall separating said vertically inclined branch slot and said arcuate aperture.

* * * * *